(12) United States Patent
Chen et al.

(10) Patent No.: US 8,824,139 B2
(45) Date of Patent: Sep. 2, 2014

(54) HANDHELD ELECTRONIC DEVICE (75) Inventors: Chih-Wei Chen, Taoyuan County (TW); Hsi-Hsing Hsu, Taoyuan County (TW); Che-Kai Lin, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 500 days.

(21) Appl. No.: 13/181,531

(22) Filed: Jul. 13, 2011

(65) Prior Publication Data
US 2013/0016457 A1  Jan. 17, 2013

(51) Int. Cl.
| | |
|---|---|
| H05K 5/00 | (2006.01) |
| H05K 7/00 | (2006.01) |
| G11B 33/02 | (2006.01) |
| A47G 1/10 | (2006.01) |
| E04G 3/00 | (2006.01) |
| A47B 96/06 | (2006.01) |
| E05C 5/02 | (2006.01) |
| H04M 1/02 | (2006.01) |

(52) U.S. Cl.
CPC .................................. *H04M 1/0237* (2013.01)
USPC ............ 361/679.56; 361/679.33; 361/679.36; 361/679.57; 361/679.59; 369/75.21; 248/316.5; 248/292.14; 248/229.22; 74/142

(58) Field of Classification Search
USPC ............ 361/679.01, 679.02, 679.08, 679.09, 361/679.3, 679.55–679.59; 345/156, 157, 345/168, 169, 184; 455/575.1, 575.3, 455/575.4, 575.8; 248/80–88, 155.1–155.5, 248/166–173, 180.1–186.2, 229.1–231.51, 248/271.4, 292.14, 316.1–316.8; 74/141–169, 380–387; 369/282, 291, 369/253, 44.16, 75.5
See application file for complete search history.

(56) References Cited

U.S. PATENT DOCUMENTS

| | | | |
|---|---|---|---|
| 8,010,169 B2 | 8/2011 | Chuang et al. | |
| 2006/0046796 A1* | 3/2006 | Park et al. | 455/575.4 |
| 2011/0018798 A1* | 1/2011 | Chiang | 345/157 |
| 2011/0244923 A1* | 10/2011 | Shen | 455/566 |
| 2011/0266018 A1* | 11/2011 | Duan et al. | 174/51 |

FOREIGN PATENT DOCUMENTS

| | | |
|---|---|---|
| TW | I330062 | 9/2010 |
| TW | M394678 | 12/2010 |

OTHER PUBLICATIONS

"Office Action of Taiwan counterpart application" issued on Jul. 22, 2013, p. 1-p. 5, in which the listed references (Foreign Patent Documents) were cited.

* cited by examiner

*Primary Examiner* — Jerry Wu
(74) *Attorney, Agent, or Firm* — Jianq Chyun IP Office (57) ABSTRACT

A handheld electronic device includes a first body, a second body, and a locating member. The second body is slidably connected to the first body, and has a slide surface and a locating opening. The locating opening is located at an end of the slide surface. The locating member has an elastic portion and a sliding portion, the elastic portion is disposed between the first body and the sliding portion, and the sliding portion is capable of leaning against the slide surface or being inserted in the locating opening under an elastic prestress of the elastic portion.

10 Claims, 8 Drawing Sheets

HANDHELD ELECTRONIC DEVICE

BACKGROUND OF THE INVENTION

1. Field of the Invention

The application relates to a handheld electronic device. Particularly, the application relates to a slide-type handheld electronic device.

2. Description of Related Art

A handheld electronic device refers to an electronic device that is held by user's hand for operation, for example, a mobile phone, a multimedia player, a personal digital assistant (PDA), a handheld computer, a handheld game machine and a handheld satellite navigator, etc. Such type of electronic device generally has a smaller volume and a lighter weight to facilitate the user to carry it around. Taking the mobile phone as an example, in order to provide a larger screen and a larger key area, clamshell and slide-type mobile phones are developed.

Taking the slide-type mobile phone as an example, two bodies of the slide-type mobile phone can be slid relative to each other to present different appearance states. During a process when the two bodies are slid relative to each other, a hand experience of the user for the slide-type mobile phone is very important, since it can be one of the reasons that the user decides to purchase such product.

SUMMARY OF THE INVENTION

The application is directed to a handheld electronic device, in which two bodies is capable of sliding relative to each other for locating.

The application provides a handheld electronic device including a first body, a second body, and a locating member. The second body is slidably connected to the first body, and has a slide surface and a locating opening. The locating opening is located at an end of the slide surface. The locating member has an elastic portion and a sliding portion, the elastic portion is disposed between the first body and the sliding portion, and the sliding portion is capable of leaning against the slide surface or being inserted in the locating opening under an elastic prestress of the elastic portion.

According to the above descriptions, in the present application, by configuring the locating opening at the end of the slide surface, relative positions of the two bodies can be fixed when the sliding portion of the locating member fits in the locating opening.

DETAILED DESCRIPTION OF DISCLOSED EMBODIMENTS

Figure 1A:
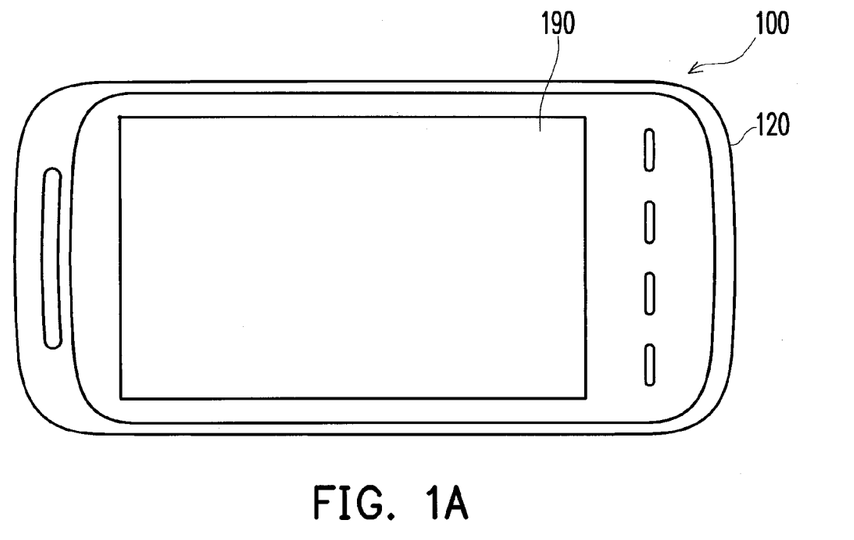
FIGS. 1A-1C are top views of a handheld electronic device according to an embodiment of the invention in a close state, a sliding state and a spread state respectively.
Figure 1B:
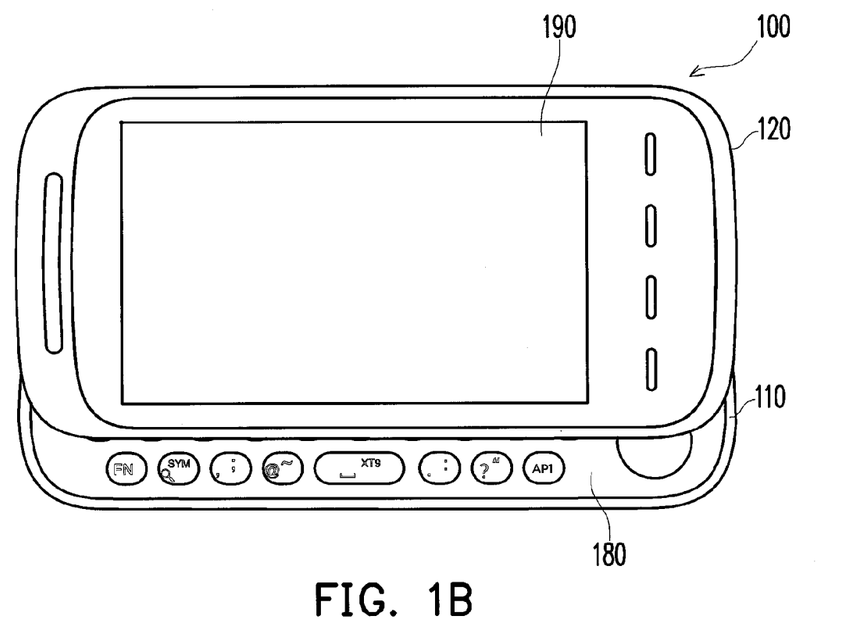
Figure 1C:
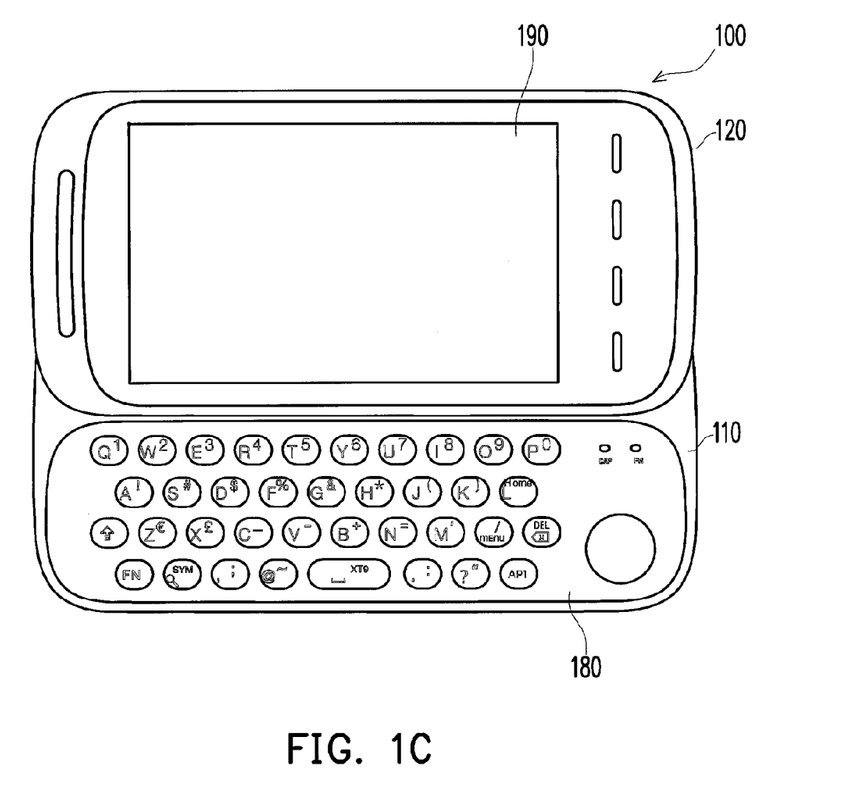

FIGS. 1A-1C are top views of a handheld electronic device according to an embodiment of the invention in a close state, a sliding state and a spread state respectively. Referring to FIGS. 1A-1C, the handheld electronic device 100 of the present embodiment can be a slide-type smart phone, though the invention is not limited thereto. The handheld electronic device 100 includes a first body 110 and a second body 120, where the second body 120 is slidably connected to the first body 110. In the present embodiment, the first body 110 may have a keyboard 190 to facilitate a user inputting information. The second body 120 may have a display screen 180 for displaying images or text information.

However, the invention is not limited thereto. As functions of the handheld electronic device 100 are diversified, the display screen 180 can be a touch screen to facilitate the user inputting information through a touch manner. Therefore, when the user uses the electronic device 100, the user may operate back and forth between the first body 110 and the second body 120. In another embodiment that is not illustrated, both of the first body 110 and the second body 120 can be configured with a display screen to implement synchronous display of dual-screen or the touch control function.

The second body 120 can be slid relative to the first body 110 to a position substantially and fully overlapped with the first body 110, i.e. the close state shown in FIG. 1A. Moreover, the second body 120 can also be slid relative to the first body 110 to a position least overlapped with the first body 110, i.e. the spread state shown in FIG. 1C. Moreover, FIG. 1B presents an in-sliding position of the second body 120 slid relative to the first body 110.

Figure 2A:
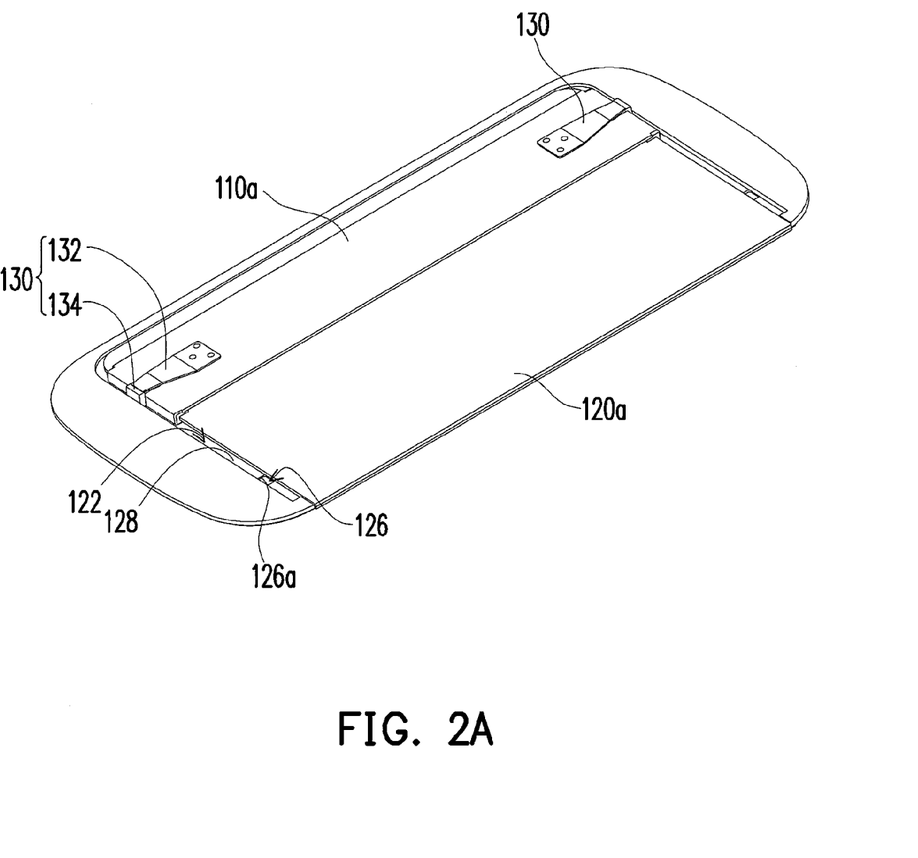
FIG. 2A and FIG. 2B are rear perspective views of internal components of the handheld electronic device of FIG. 1A in a combination state and an exploded state respectively.
Figure 2B:
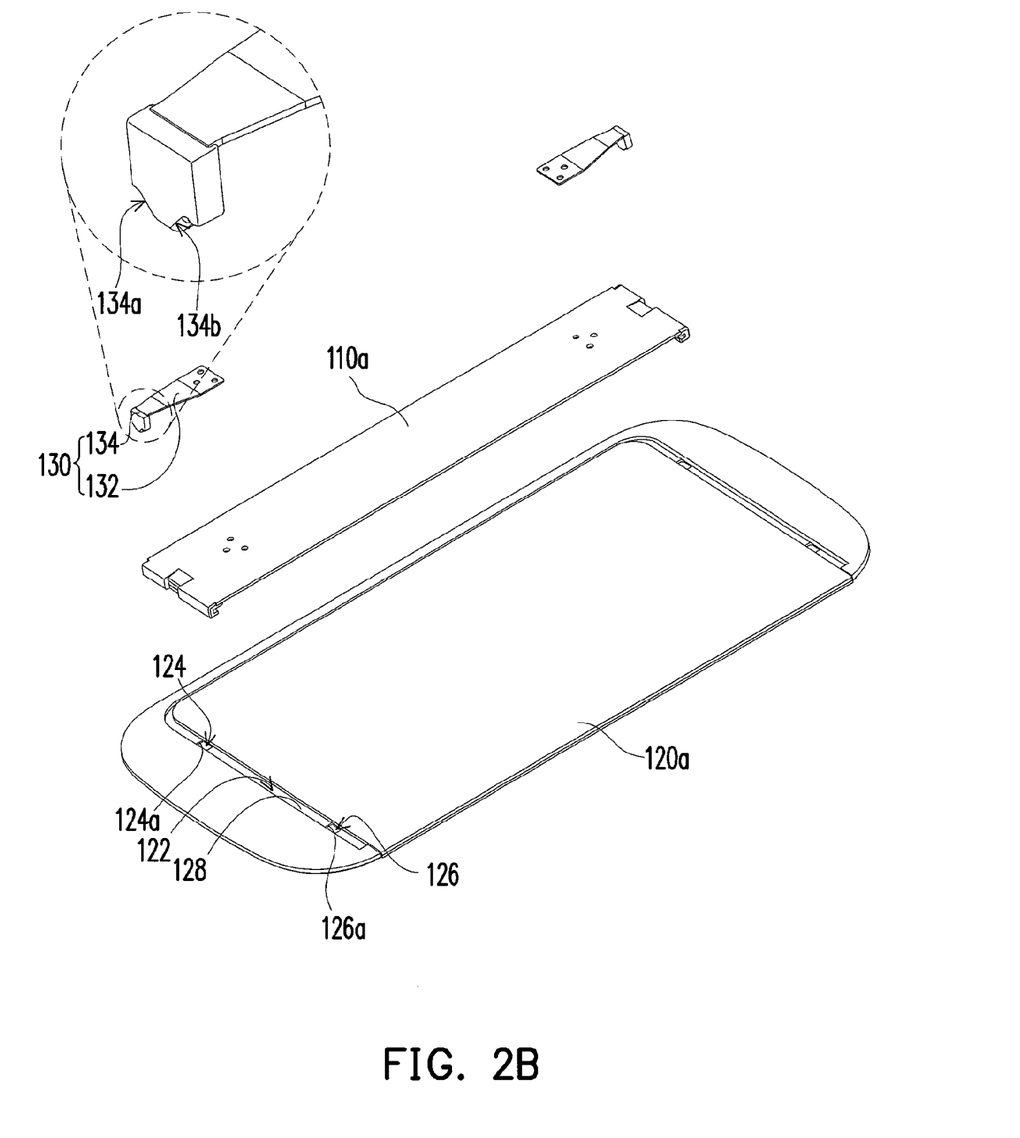

FIG. 2A and FIG. 2B are rear perspective views of internal components of the handheld electronic device of FIG. 1A in a combination state and an exploded state respectively. Referring to FIG. 2A and FIG. 2B, in the present embodiment, the first body 110 of FIG. 1A has a first sliding rack 110a, and the second body 120 has a second sliding rack 120a, and the second sliding rack 120a is slidably connected to the first sliding rack 110a. In the present embodiment, the first body 110 is slidably connected to the second body 120 through a sliding connection of the first rack 110a and the second rack 120a.

The second body 120 has a slide surface 122, a first locating opening 124 and a second locating opening 126, where the first locating opening 124 and the second locating opening 126 are respectively located at two ends of the slide surface 122. In the present embodiment, the second sliding rack 120a can be used to form the slide surface 122, the first locating opening 124 and the second locating opening 126. In another embodiment that is not illustrated, only the first locating opening 124 or the second locating opening 126 is maintained to provide a special hand experience at one end or another end of the slide surface 122.

The handheld electronic device 100 further has a locating member 130. The locating member 130 has an elastic portion 132 and a sliding portion 134, the elastic portion 132 is disposed between the first body 110 and the sliding portion 134, and the sliding portion 134 is capable of leaning against the slide surface 122, being inserted in the first locating opening 124 or being inserted in the second locating opening 126 under an elastic prestress of the elastic portion 132. When the sliding portion 134 fits in the first locating opening 124 or the second locating opening 126, a relative position of the first body 110 and the second body 120 is fixed.

In the present embodiment, one end of the elastic portion 132 can be fixed to the second body 120 (the second sliding rack 120a), and the sliding portion 134 can be fixed to another end of the elastic portion 132. The elastic portion 132 can be a leaf spring. A material of the sliding portion 134 can be polyoxymethylene (POM) to improve sliding smoothness.

In the present embodiment, corresponding to the sliding connection between two sides of the first sliding rack 110a and two sides of the second sliding rack 120a, the slide surface 122, the first locating opening 124, the second locating opening 126 and the locating member 130 are appeared in pairs. However, for simplicity's sake, only the slide surface 122, the first locating opening 124, the second locating opening 126 and the locating member 130 located at one side of the first sliding rack 110a (or the second sliding rack 120a) are described.

Figure 3A:
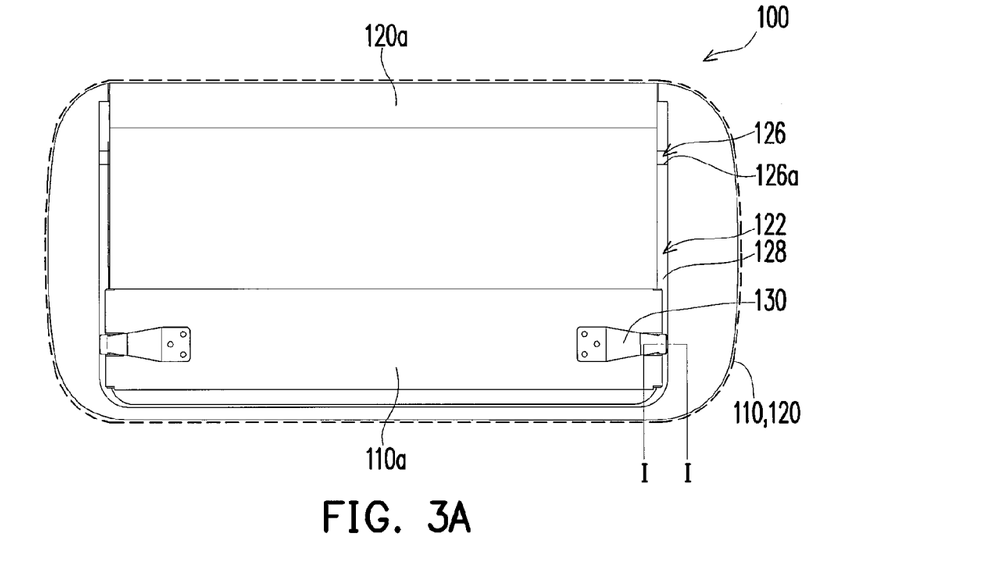
FIGS. 3A-3C are rear views of the handheld electronic device of FIG. 1A in the close state, the sliding state and the spread state respectively.
Figure 3B:
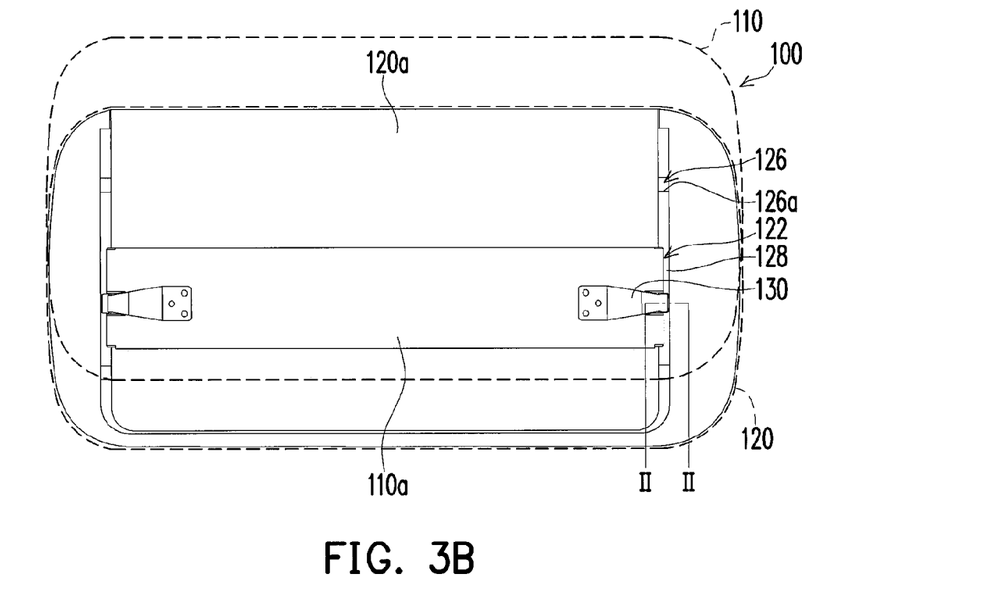
Figure 3C:
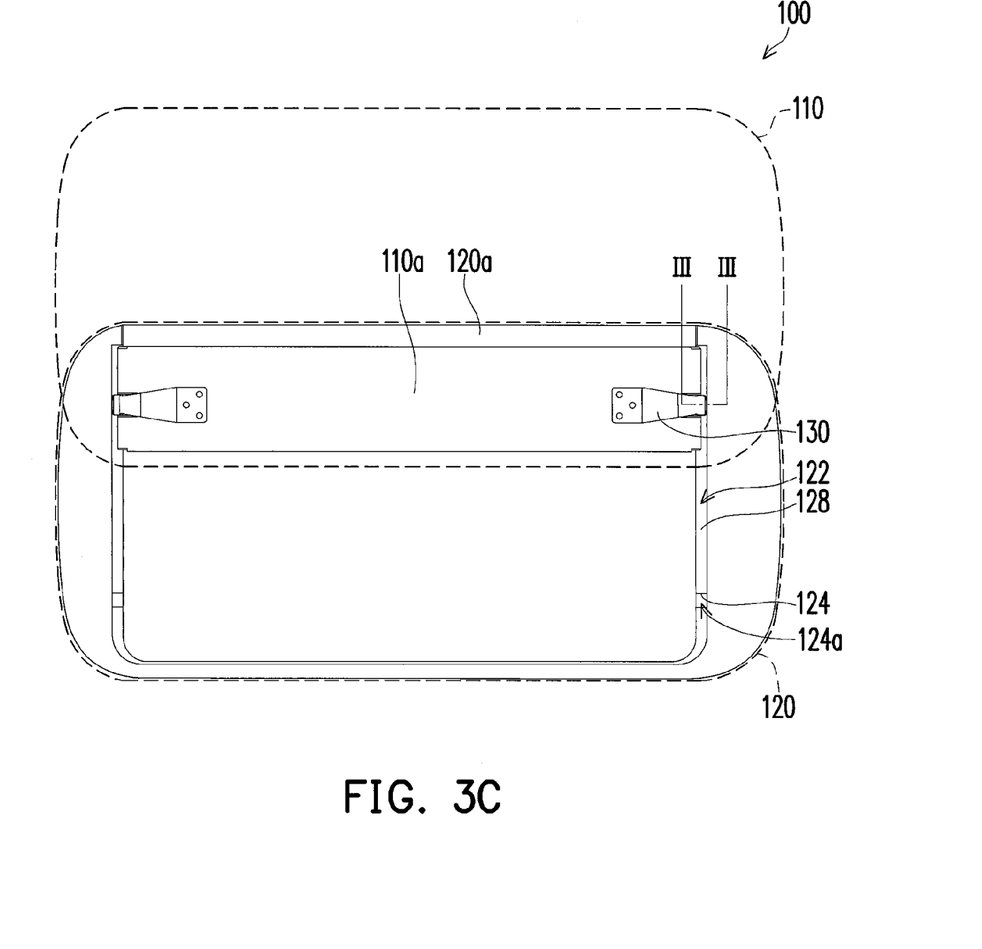

FIGS. 3A-3C are rear views of the handheld electronic device of FIG. 1A in the close state, the sliding state and the spread state respectively. In FIGS. 3A-3C, for simplicity's sake, a profile of the first body 110 and a profile of the second body 120 are shown by dot lines. Referring to FIGS. 3A-3C, in the present embodiment, when the second body 120 slides relative to the first body 110 along a sliding path from a close position to a spread position, the handheld electronic device 100 is correspondingly in the close state, the sliding state and the spread state.

Figure 4A:
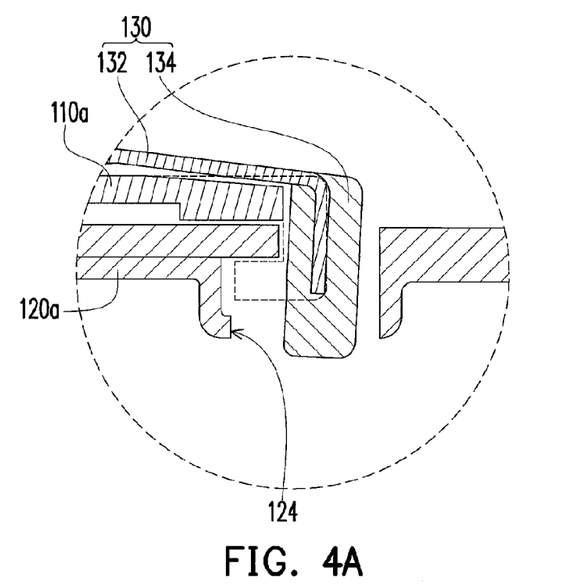
FIG. 4A is an enlarged cross-sectional view of FIG. 3A taken along line I-I.

FIG. 4A is an enlarged cross-sectional view of FIG. 3A taken along line I-I. Referring to FIG. 3A and FIG. 4A, when the second body 120 slides relative to the first body 110 to the close position, the sliding portion 134 fits in the first locating opening 124 from the slide surface 122 under the elastic prestress of the elastic portion 132. Comparatively, when the second body 120 slides relative to the first body 110 to depart from the close position, the sliding portion 134 has to overcome the elastic prestress of the elastic portion 132 to depart from the first locating opening 124 for again leaning against the slide surface 122.

In the present embodiment, the sliding portion 134 has a first slope 134a (shown in FIG. 2B). When the sliding portion 134 departs from the first locating opening 124, the first slope 134a leans against an edge 126a (shown in FIG. 2B and FIG. 3C) of the first locating opening 124 adjacent to the slide surface 122. Therefore, configuration of the first slope 134a avails the sliding portion 134 departing from the first locating opening 124.

Figure 4B:
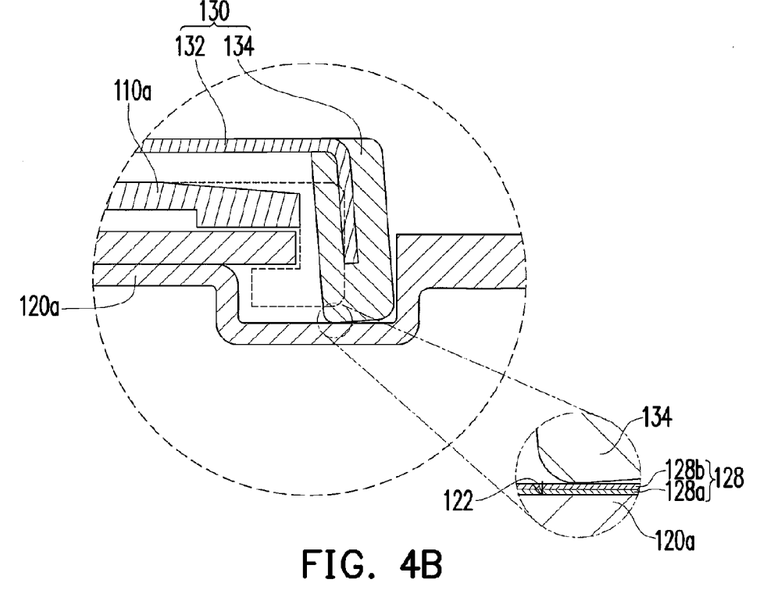
FIG. 4B is an enlarged cross-sectional view of FIG. 3B taken along line II-II.

FIG. 4B is an enlarged cross-sectional view of FIG. 3B taken along line II-II. Referring to FIG. 3B and FIG. 4B, when the second body 120 is in the in-sliding position relative to the first body 110, the sliding portion 134 is continuously under a function of the elastic prestress of the elastic portion 132 to lean against the slide surface 122. During the sliding process, to decrease roughness of the slide surface 122 to improve the sliding smoothness, the second body 120 may further have a low friction layer 128 disposed on the slide surface 122. The low friction layer 128 can be composed of a polytetrafluoroethylene layer 128a (i.e. the so-called Teflon) and a lubricant film 128b, where the lubricant film 128b is disposed on the polytetrafluoroethylene layer 128a. In another embodiment, the low friction layer 128 may only include the polytetrafluoroethylene layer 128a or the lubricant film 128b.

Figure 4C:
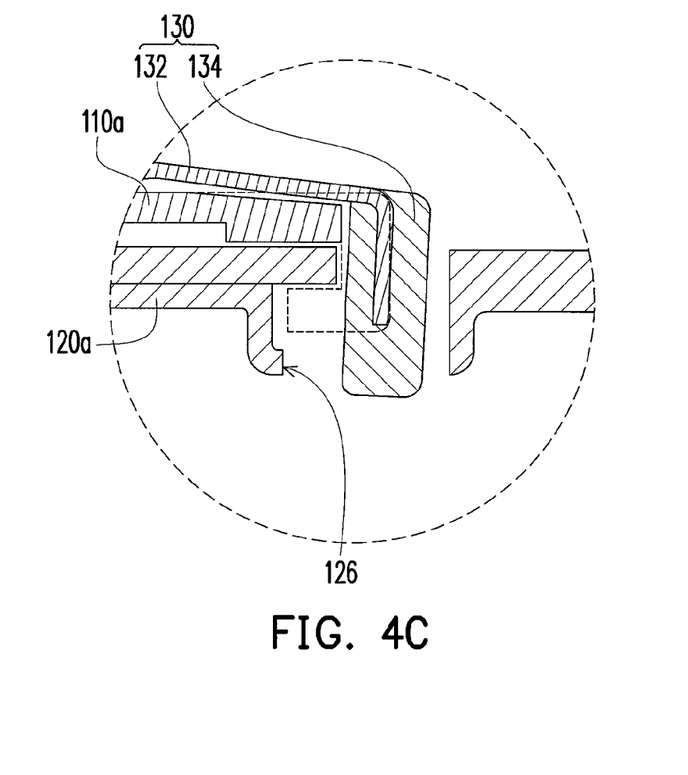
FIG. 4C is an enlarged cross-sectional view of FIG. 3C taken along line III-III.

FIG. 4C is an enlarged cross-sectional view of FIG. 3C taken along line III-III. Referring to FIG. 3C and FIG. 4C, when the second body 120 slides relative to the first body 110 to the spread position, the sliding portion 134 fits in the second locating opening 126 from the slide surface 122 under the elastic prestress of the elastic portion 132. Comparatively, when the second body 120 slides relative to the first body 110 to depart from the spread position, the sliding portion 134 has to overcome the elastic prestress of the elastic portion 132 to depart from the second locating opening 126 for again leaning against the slide surface 122.

In the present embodiment, the sliding portion 134 further has a second slope 134b (shown in FIG. 2B). When the sliding portion 134 departs from the second locating opening 126, the second slope 134b leans against an edge 127a (shown in FIG. 2B and FIG. 3A) of the second locating opening 126 adjacent to the slide surface 122. Therefore, configuration of the second slope 134b avails the sliding portion 134 departing from the second locating opening 126.

In summary, in the present embodiment, by configuring the locating openings at the ends of the slide surface, when the sliding portion of the locating member fits in the locating openings, relative positions of the two bodies can be fixed. Moreover, by disposing the low friction layer on the slide surface to reduce the roughness of the slide surface and improve the sliding smoothness, a special hand experience is provided to the user during the sliding process of the two bodies.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A handheld electronic device, comprising:
a first body;
a second body, slidably connected to the first body, and having a slide surface and a first locating opening, wherein the first locating opening is located at an end of the slide surface; and
a locating member, having an elastic portion and a sliding portion connected to the elastic portion, wherein the elastic portion connects the first body and the sliding portion, and the sliding portion is capable of leaning against the slide surface or being inserted in the first locating opening under an elastic prestress of the elastic portion, the first body has a first sliding rack, the second body has a second sliding rack, the second sliding rack is slidably connected to the first sliding rack, the elastic portion connects the first sliding rack and the sliding portion, the second sliding rack forms the slide surface and the first locating opening, and a direction in which an elastic force of the elastic portion acts is substantially perpendicular to the first sliding rack and the second sliding rack.

2. The handheld electronic device as claimed in claim 1, wherein the second body is capable of sliding relative to the first body to a position, and when the second body slides relative to the first body to the position, the sliding portion correspondingly fits in the first locating opening.

3. The handheld electronic device as claimed in claim 2, wherein the sliding portion has a first slope, and when the sliding portion fits in the first locating opening or departs from the first locating opening, the first slope leans against an edge of the first locating opening adjacent to the slide surface.

4. The handheld electronic device as claimed in claim 1, wherein the second body further has a second locating opening, the first locating opening and the second locating opening are respectively located at two ends of the slide surface, the second body is capable of sliding relative to the first body to a close position or a spread position, when the second body slides relative to the first body to the close position, the sliding portion correspondingly fits in the first locating opening, and when the second body slides relative to the first body to the spread position, the sliding portion correspondingly fits in the second locating opening.

5. The handheld electronic device as claimed in claim 4, wherein the sliding portion has a first slope and a second slope, when the sliding portion fits in the first locating opening or departs from the first locating opening, the first slope leans against an edge of the first locating opening adjacent to the slide surface, and when the sliding portion fits in the second locating opening or departs from the second locating opening, the second slope leans against an edge of the second locating opening adjacent to the slide surface.

6. The handheld electronic device as claimed in claim 1, wherein one end of the elastic portion is fixed to the seeend first body, and the sliding portion is fixed to another end of the elastic portion.

7. The handheld electronic device as claimed in claim 1, wherein the elastic portion is a leaf spring.

8. The handheld electronic device as claimed in claim 1, wherein a material of the sliding portion is polyoxymethylene (POM).

9. The handheld electronic device as claimed in claim 1, wherein the second body further has a low friction layer, and the low friction layer is disposed on the slide surface.

10. The handheld electronic device as claimed in claim 9, wherein the low friction layer is a polytetrafluoroethylene layer, a lubricant film or a stacking layer composed of the polytetrafluoroethylene layer and the lubricant film.

\* \* \* \* \*